Patented Aug. 16, 1932

1,872,234

UNITED STATES PATENT OFFICE

WILLIS A. BOUGHTON, OF CAMBRIDGE, MASSACHUSETTS, ASSIGNOR TO NEW ENGLAND MICA CO., OF WALTHAM, MASSACHUSETTS, A CORPORATION OF MASSACHUSETTS

COLORED COMPOSITE INSULATING MATERIAL

No Drawing. Application filed October 9, 1928. Serial No. 311,419.

This invention relates to a colored composite insulating material and to the method of making the same.

One object of the invention is to produce a novel colored composite insulating material and to provide a novel and highly useful method for manufacturing the same.

A further object of the invention is to produce a novel colored composite mica body which is attractive in appearance, may be economically manufactured and is designed for use in decorative fields as well as for those general industrial purposes for which the uncolored composite mica bodies are at present used.

A further and more specific object of the invention is to provide a novel method for the production of the improved colored composite mica body.

With these objects in view and such others as may hereinafter appear, the invention consists in the colored composite insulating material and method of making the same hereinafter described and particularly defined in the claims at the end of this specification.

Prior to the present invention, integrated or composite insulating materials have been made by assembling together a large number of flakes or pieces of the insulating material and cementing the same together to form the composite material with the aid of heat and pressure. Various binders have been employed in the production of such composite insulating material, and one example of the manufacture of such insulating material comprises the mica flake plates which are extensively used for industrial purposes, particularly for insulating work. In practice it has been proposed to produce these mica flake plates utilizing various inorganic binders and subjecting the composite mica plates to heat and pressure to firmly unite the individual flakes into a unitary mass capable of withstanding the relatively high temperatures to which these mica flake plates are sometimes subjected in their practical use. As set forth in the patents to Dawes and Boughton Nos. 1,578,812 and 1,578,813, the following different inorganic binders have been proposed:

(No. 1) Sodium silicate solution (highly viscous), 72 cc.; dry sodium carbonate, 2 g.; dry potassium carbonate, 2 g.; fused potassium hydroxide, 1.5 g.; water, 50 cc.

(No. 2) Sodium silicate solution, 72 cc.; potassium carbonate, 2.2 g.; potassium nitrate, 2 g.; magnesium oxide, 4 g.; water, 50 cc.

(No. 3) Sodium tetraborate (borax), 25 g.; potassium carbonate, 5 g.; calcium oxide, 5 g.; water, 100 cc.

(No. 4) Sodium metaphosphate, 12 g.; sodium carbonate, 2 g.; calcium oxide, 2 g.; water, 38 cc.

(No. 5) Monobasic sodium phosphate, 3 g.; crystallized borax, 6 g.; water, 22 cc.

For certain purposes and in order to adapt the composite insulating materials, such as the composite mica flake plates, to decorative uses and purposes, such as the production of lamp shades and other articles, it is desirable that colors or combinations of colors be imparted to or incorporated in the insulating materials, and in accordance with the present invention a novel and highly useful colored composite insulating material is provided which lends itself particularly for use for decorative purposes and which at the same time may be of a composition such as to enable it to be used for all of the various purposes for which the similar uncolored insulating materials are at present used.

In the preferred process for producing a colored composite insulating material embodying the present invention, the coloring material is produced in the binder which is used in uniting the component parts of the insulating material and may with advantage be formed in the binder by chemical reaction during the heating and pressing to which the insulating material is subjected during its manufacture. In practice it is preferred to mix certain inorganic compounds with the binder, in which, when those compounds are dissolved or fused or reacted with the binder by heat, the color is produced. For example, when the binder salts are chiefly monobasic alkali orthophosphates or alkali borates or carbonates or these in suitable combination, the flux formed by fusion dissolves or reacts with certain of the substances, to produce products having characteristic colors. Thus, for example, a very deep blue may be produced utilizing merely sodium metaphosphate as the binder and fusing with it a little cobalt oxide. In practice this may be made by heating a mixture of mono sodium orthophosphate and a little cobalt oxide at the fusion temperature when sodium metaphosphate is formed by loss of water and this when formed becomes the solvent for or a reactant with the cobalt oxide to form the blue glass-like mass.

In the manufacture of composite mica flake plates, it is preferred to unite the component flakes under heat and pressure by a glass-like cementitious binder as set forth in the United States patents to Dawes and Boughton above referred to, and in producing a colored composite mica flake plate, the color-imparting substances may be incorporated in the binder ingredients so that when the plate is subjected to heat and pressure, chemical reaction takes place producing the color compound and imparting color to the binder and thereby coloring the composite plate. In some instances where the composition of the binder is such as to include one of the salts used in producing the color compound, such for example as the composition above referred to in the Dawes and Boughton patents in which sodium metaphosphate forms a part of the binder, then it is merely necessary to add a selected inorganic salt or oxide such as a metal oxide which upon reaction by fusion with the sodium metaphosphate will produce the mixed compound possessing the characteristic color which it is desired to impart to the binder and to the composite plate. In other instances where the composition of the binder is such that it does not include a salt or compound capable of use in producing the color compound, then predetermined quantities of the color producing salts or oxide may be incorporated into the binder and the remainder of the process performed in producing the composite plate exactly as set forth in the Dawes and Boughton patents above referred to.

As examples of suitable color producing salts and oxides which may be used in imparting different colors to the composite mica flake plates, as above set forth, a very deep blue color may be produced by reaction of cobalt oxide with sodium metaphosphate. Iron oxide together with sodium metaphosphate produces a brownish or greenish color depending upon the state of oxidation of the iron. Chromium oxide may be used to produce a green, and in fact various metal oxides and combinations of metal oxides, as well as other known inorganic salts, some of which are water soluble, may be used to provide practically any desired color in almost any degree of intensity.

The present process of producing a colored composite mica flake plate is of particular advantage in that the general process of producing the composite plate may be carried on exactly as has heretofore been found to be the best practice, with the exception that the color imparting chemicals may be incorporated in suitable quantities in the binder and do not have any deleterious effect upon the same, enabling the composite plate to be used for all of the purposes for which it has heretofore been used, and at the same time enabling it to be used successfully in decorative fields. In practicing the present process the color may be uniformly produced over the entire area of the plate, or if desired the color producing chemicals may be distributed in the composite plate in such manner as to produce variegated or multi-colored patterns of any desired ornamental nature.

In practice it has been found that the addition of six per cent of a color producing compound calculated on the basis of the total dry weight of the salts used in the glass-like binder will give a mica plate of marked and individual color. Smaller proportions of the color producing salt will produce lighter tones and larger amounts will produce deeper colors.

The word "reaction" as used herein is intended to include both chemical reaction and physical reaction, in respect to the production of the color, as above described by fusion or solution.

While the preferred embodiment of the invention has been illustrated and described, and the preferred process for producing the improved insulating material has been pointed out, it will be understood that modification may be made therein within the scope of the following claims.

Having thus described the invention what is claimed is:—

1. The method of producing insulating bodies, characterized by association of mica fragments with a binding material comprising a glass-like salt of an alkaline metal and about six percent of a metal oxide color producing agent of the class described depending on the depth of color desired, which at ordinary atmospheric pressure, requires a temperature substantially as high as the disintegration point of mica to render the salt fluid, raising the associated mica fragments and binding material to a temperature below that at which mica disintegrates and applying pressure adequate to make the binding material flow at that temperature.

2. An insulating body in which are combined mica fragments and a binding material comprising a glass-like salt of an alkaline metal combined with about six percent of a metal oxide color producing agent of the class described depending on the depth of color desired, said salt characterized by a liquefying temperature at ordinary atmospheric pressure substantially at least as high as the decomposition temperatures of mica.

In testimony whereof I affix my signature.

WILLIS A. BOUGHTON.